United States Patent
Pierres et al.

(10) Patent No.: US 11,833,881 B2
(45) Date of Patent: Dec. 5, 2023

(54) AIR INTAKE HOUSING AND BLOWER FOR A CORRESPONDING MOTOR VEHICLE HEATING, VENTILATION AND/OR AIR CONDITIONING DEVICE

(71) Applicant: Valeo Systemes Thermiques, Le Mesnil-Saint-Denis (FR)

(72) Inventors: Philippe Pierres, Le Mesnil Saint-Denis (FR); Fabrice Ailloud, Mesnil Saint-Denis (FR); Thierry Barbier, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 341 days.

(21) Appl. No.: 17/278,944

(22) PCT Filed: Sep. 9, 2019

(86) PCT No.: PCT/FR2019/052070
§ 371 (c)(1),
(2) Date: Mar. 23, 2021

(87) PCT Pub. No.: WO2020/065164
PCT Pub. Date: Apr. 2, 2020

(65) Prior Publication Data
US 2022/0032727 A1    Feb. 3, 2022

(30) Foreign Application Priority Data

Sep. 25, 2018 (FR) ...................................... 1858755

(51) Int. Cl.
*B60H 1/00* (2006.01)
*F04D 29/28* (2006.01)

(52) U.S. Cl.
CPC ..... *B60H 1/00471* (2013.01); *B60H 1/00021* (2013.01); *B60H 1/00664* (2013.01); *F04D 29/283* (2013.01); *B60H 2001/00085* (2013.01)

(58) Field of Classification Search
CPC ............ B60H 1/00471; B60H 1/00664; B60H 2001/00085; B60H 1/24; B60H 1/00671; B60H 1/00849
(Continued)

(56) References Cited

U.S. PATENT DOCUMENTS 11,499,568 B2 * 11/2022 Kosaka ................... F04D 17/16
2004/0067728 A1    4/2004 Murakami et al.
(Continued)

FOREIGN PATENT DOCUMENTS

JP      2006-321272 A     11/2006
JP      2018-035791 A     3/2018
(Continued)

OTHER PUBLICATIONS

International Search Report and Written Opinion in corresponding International Application No. PCT/FR2019/052070, dated Jan. 17, 2020 (12 pages).
(Continued)

*Primary Examiner* — Ko-Wei Lin
(74) *Attorney, Agent, or Firm* — Osha Bergman Watanabe & Burton LLP

(57) ABSTRACT

The invention relates to an air intake housing (21), in particular for a heating, ventilation and/or air conditioning device, comprising: —at least two distinct air inlets (24, 26), and —air guiding members (27, 28, 30) configured to direct at least one air flow that is intended to be admitted into the air intake housing (21). According to the invention, the air guiding members comprise at least three flaps (27, 28, 30), one of these being a central flap (27) and two lateral flaps (28, 30) arranged one on each side of the central flap (27), said flaps (27, 28, 30) being positioned between the said two distinct air inlets (24, 26) of the air intake housing (21) so as to be able to move about a single axis of pivoting (33). The invention also relates to a suction blower (1) comprising such an air intake housing (21) and to a corresponding heating, ventilation and/or air conditioning device.

11 Claims, 4 Drawing Sheets

(58) Field of Classification Search
USPC .................................................. 454/143, 139
See application file for complete search history.

(56) References Cited

U.S. PATENT DOCUMENTS

| | | | | |
|---|---|---|---|---|
| 2012/0207593 | A1* | 8/2012 | Ochiai ............... | B60H 1/00471 |
| | | | | 415/204 |
| 2016/0355069 | A1* | 12/2016 | Vincent .................. | F04D 25/06 |
| 2017/0096045 | A1* | 4/2017 | Jung .................. | B60H 1/00028 |
| 2018/0170147 | A1 | 6/2018 | Wright et al. | |

FOREIGN PATENT DOCUMENTS

| | | | |
|---|---|---|---|
| KR | 20030052492 | A | 6/2003 |
| KR | 101836694 | B1 | 3/2018 |
| WO | 2013182710 | A1 | 12/2013 |
| WO | 2018112316 | A1 | 6/2018 |

OTHER PUBLICATIONS

Notification of Reason for Rejection in Japanese Patent Application No. 2021-541321, dated Apr. 15, 2022 (13 pages).

\* cited by examiner

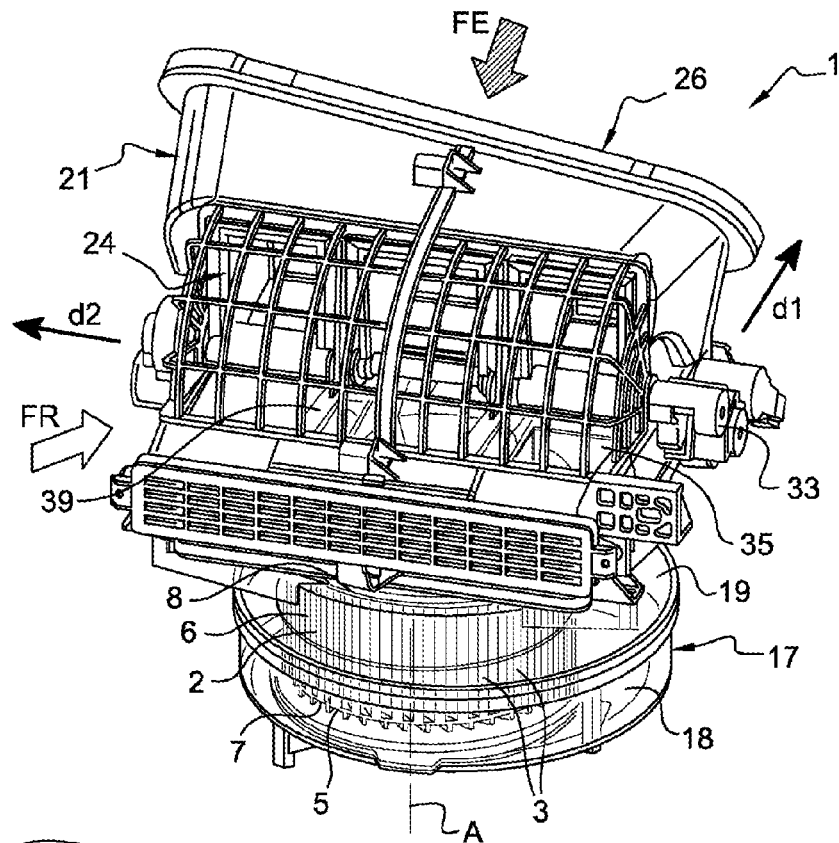
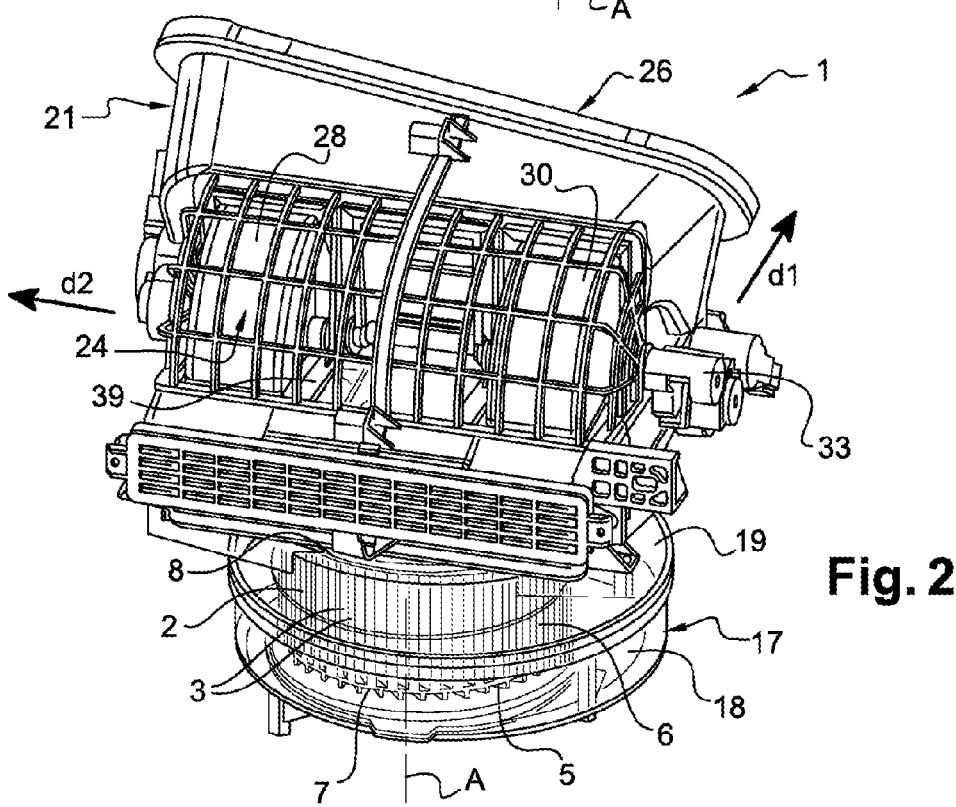

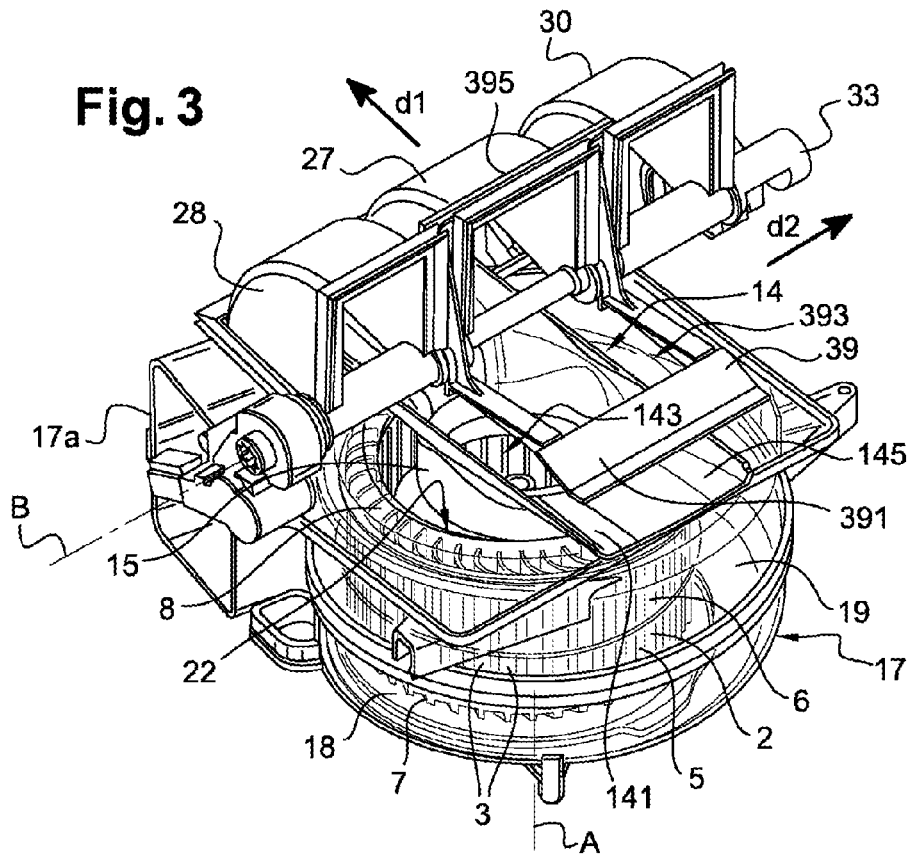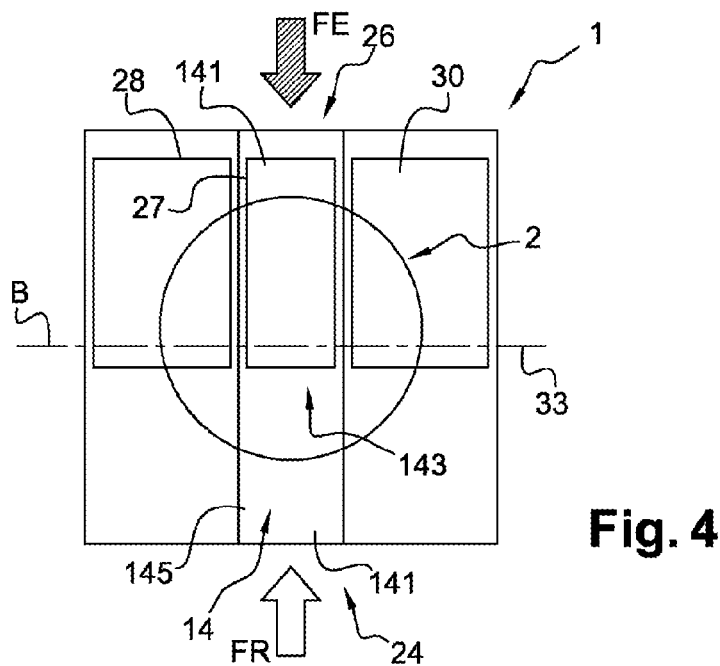

AIR INTAKE HOUSING AND BLOWER FOR A CORRESPONDING MOTOR VEHICLE HEATING, VENTILATION AND/OR AIR CONDITIONING DEVICE

TECHNICAL FIELD OF THE INVENTION

The present invention relates to an air intake housing and to an intake blower comprising such an air intake housing, intended for a motor vehicle heating, ventilation and/or air conditioning device. The invention also relates to a heating, ventilation and/or air conditioning device comprising such a blower.

PRIOR ART

A motor vehicle comprises an interior into which air, conventionally derived from a heating, ventilation and/or air conditioning device, emerges.

The heating, ventilation and/or air conditioning device, also known by the abbreviation HVAC, may be supplied either with air external to the vehicle (also referred to as fresh air), or with recirculated air, which is to say air derived from the vehicle interior. In the known way, a blower is used to cause the airflow to circulate. This may be the flow of fresh or new air coming from outside the vehicle, or the flow of recirculated air coming from the vehicle interior, or else a mixture of the exterior-air and recirculated-air airflows.

It is important to be able to separate the airflows (exterior air—recirculated air), particularly when the airflows are passing through the heating, ventilation and/or air conditioning device, according to the needs of the occupants of the vehicle, or in other words, when the airflows are being thermally conditioned.

This is because since the recirculated air is already at a temperature close to the setpoint temperature that is to be achieved, it is thus possible to achieve the temperature desired by the user rapidly. However, the recirculated air is more laden with moisture than the air coming from outside the vehicle, which means that, if the recirculated air is directed toward the windshield, via the ventilation openings situated in front of the driver or in front of the front-seat passenger, for example, or directly onto the windshield, the moisture contained in the recirculated air condenses on the windshield and creates fog.

One known solution is to thermally condition the exterior-air airflow and to send it into the interior in the vicinity of the windshield or directly onto the latter, and to thermally condition the recirculated-air airflow and send it into the interior some way away from the windshield, through the other ventilation openings, such as the ventilation opening outlets situated at the feet of the driver or front-seat passenger. This is a mode of operation referred to as "double layer".

Known heating, ventilation and/or air conditioning devices comprise air inlet means comprising an air inlet housing allowing one or more distinct airflows to enter the blower, and an air generation member such as a turbine, for example cylindrical, configured to be driven in rotation about its axis so as to blow the airflow or airflows.

Such a blower is known as an "single-intake" blower because the air enters the blower on just one side of the turbine, namely on the side on which the housing and the member for separating the airflows are situated.

In order to separate two airflows, notably the recirculated-air airflow and the exterior-air airflow, the blower may comprise an airflow separation member configured to delimit a first air circulation duct that allows the flow of a first airflow which is intended to pass through a first axial part of the turbine and a second air circulation duct allowing the flow of a second airflow intended to pass through a second axial part of the turbine. This airflow separation member defines a duct separating the airflows into a central flow circulating inside the duct that forms the first air circulation duct, and a peripheral flow circulating at the periphery of the duct, the second air circulation duct extending on the outside of the airflow separation member.

The airflow separation member extends for example in part into the internal space of the turbine as far as a point situated beyond an end of the turbine on the air intake housing side. The air intake housing covers this end of the turbine and the airflow separation member.

These devices also need to be able to ensure accelerated warming-up of the air in the interior so that the passengers of the vehicle can experience thermal comfort as rapidly as possible. In other words, these devices need to be able to ensure that the air in the interior is at a temperature higher than 20° in a minimal length of time, for example in under 25 minutes, and be able to do this despite external temperatures that are low, i.e. −20° C. These parameters are grouped together under the term "warm-up" of the air in the vehicle interior.

SUMMARY OF THE INVENTION

It is an objective of the invention to at least partially alleviate these problems of the prior art by proposing an alternative form of blower that is able to improve the "warm-up" of the air in the interior.

To this end, one subject of the invention is an air intake housing, notably for a heating, ventilation and/or air conditioning device, comprising:
  at least two distinct air inlets extending over a width of the air intake housing 21, and
  air guiding members configured to direct at least one airflow intended to be admitted into the air intake housing.

The air guiding members comprise at least three, preferably coaxial, flaps, these being a central flap and two lateral flaps arranged on either side of the central flap, said coaxial flaps being arranged between said two distinct air inlets of the air intake housing, such as to be able to move about a single pivot axle.

According to the invention, the central flap extends over a portion of said width of the air intake housing that is greater than the portion of the width over which the two lateral flaps extend.

Because the flaps are coaxial, the width here corresponds to the pivot axle of the flaps, which means that it is understood that the central flap is able to block off, for each air inlet, a greater surface area than the two lateral flaps. In other words, the central flap extends over more than half of the width of the air passage cross section in the air intake housing or, in other words, the central flap is configured to block off more than half of the surface area of each air inlet.

Such an arrangement makes it possible to optimize the proportion of the air flow that is entering and be able easily to alter the quantities of recirculated air/exterior air flow. Thus, when the vehicle is started in cold weather, the central flap will allow recirculated air to be introduced in greater quantity than exterior air, so the air will thus be warmed up more quickly. Nevertheless, a quantity of exterior air will be directed toward the windshield by the lateral flaps so as to limit the phenomena of fogging, namely of the creation of mist on the windshield. As the central flap has larger dimensions, or in other words, occupies a greater volume than the two lateral flaps combined, it is appropriate that the flow of recirculated air will be introduced in greater proportions than the flow of exterior air and this will therefore result in accelerated "warm-up", while at the same time avoiding the phenomena of fogging of the windshield.

Said air intake housing may also have one or more of the following features, considered separately or in combination:
    said coaxial flaps are each arranged with the ability to move between a first extreme position, in which said flap closes off one air inlet, and a second extreme position, in which said flap closes off the other air inlet;
    said coaxial flaps are of the drum type;
    the air intake housing has at least one end stop against which a lateral flap is configured to come to bear in one extreme position;
    the coaxial flaps are considered to direct an airflow into the first air circulation duct and/or into the second air circulation duct;
    the central flap extends over a portion of said width of the air intake housing that is comprised within an interval located between 60% and 80% of said width of the air intake housing, preferably 70%.

The invention also relates to an intake blower, notably for a motor vehicle heating, ventilation and/or air conditioning device, the blower comprising:
    a turbine configured to be driven in rotation about an axis and having at least a first axial part termed "upper part" and a second axial part termed "lower part",
    a blower housing surrounding the turbine and having a blower housing outlet extending along an axis, and
    an air intake housing as described hereinabove, the pivot axle of the coaxial flaps being parallel to the axis of extension of the blower housing outlet.

Said blower may also comprise one or more of the following features, considered separately or in combination:
    the pivot axle of the coaxial flaps is orthogonal to the axis of rotation of the turbine;
    the dividing partition has an intermediate part arranged between an upstream part and a downstream part in such a way as to connect these two parts, the intermediate part is arranged at an end of the turbine, the intermediate part having a cross section that is reduced in comparison with the two, upstream and downstream, parts,
    said blower further comprises a dividing partition extending at least in part into the turbine, so as to separate a first airflow intended to pass through the first axial part of the turbine from a second airflow intended to pass through the second axial part of the turbine;
    the dividing partition has an upstream end extending into the air intake housing in a main direction of extension orthogonal to the axis of extension of the blower housing outlet or to the axis of flow of at least one airflow leaving the blower housing, and to the axis of rotation of the turbine;
    the axis of extension of the blower housing outlet is orthogonal to the axis of rotation of the turbine;
    the air intake housing comprises an internal space delimiting an air passage section having a first dimension in a direction orthogonal to the axis of extension of the blower housing outlet and a second dimension parallel to the axis of extension of the blower housing outlet;
    the upstream end of the dividing partition extends over the entirety of the first dimension and over part of the second dimension;
    the dividing partition defines an internal duct of closed contour;
    the internal duct forms at least part of a first air circulation duct that allows the flow of the first airflow, a second air circulation duct that allows the flow of the second airflow extending on the outside of the dividing partition;
    the dividing partition is arranged fixedly in said blower;
    the dividing partition is coaxial with the turbine;
    the dividing partition has a shape exhibiting symmetry of revolution about the axis of rotation of the turbine;
    the dividing partition has an upstream part of cylindrical overall shape ending in the upstream end;
    the dividing partition has a downstream part that is flared on the opposite side to the upstream end;
    said blower further comprises an additional dividing partition arranged in the air intake housing in such a way as to at least partially surround an end region of the central flap in one extreme position;
    the additional dividing partition is arranged fixedly in said blower;
    the additional dividing partition has a frame extending mainly in a direction of extension orthogonal to the axis of extension of the blower housing outlet;
    the additional dividing partition comprises a belt extending plumb with the frame so as to at least partially surround an end region of the central flap in one extreme position;
    the frame of the additional dividing partition has at least one end stop against which the central flap is configured to come to bear in one extreme position;
    the frame of the additional dividing partition has a shape that complements the shape of the upstream end of the dividing partition;
    the frame of the additional dividing partition is arranged facing the dividing partition;
    said one blower further comprising a filter arranged axially between the dividing partition and the additional dividing partition.

The invention further relates to a heating, ventilation and/or air conditioning device comprising an intake blower as described hereinabove.

BRIEF DESCRIPTION OF THE FIGURES

Further features and advantages of the invention will become apparent from reading the following description, with reference to the accompanying figures, of which:

FIG. 1 is a perspective view of a blower;

FIG. 2 is another perspective view of the blower of FIG. 1;

FIG. 3 is a schematic view of the blower of FIG. 1 from which an air intake housing has been removed;

FIG. 4 schematically depicts a view from above of the blower of FIGS. 1 and 3,

In these figures, identical elements have been referenced with the same references.

DETAILED DESCRIPTION OF THE EMBODIMENTS

Figure 5A:
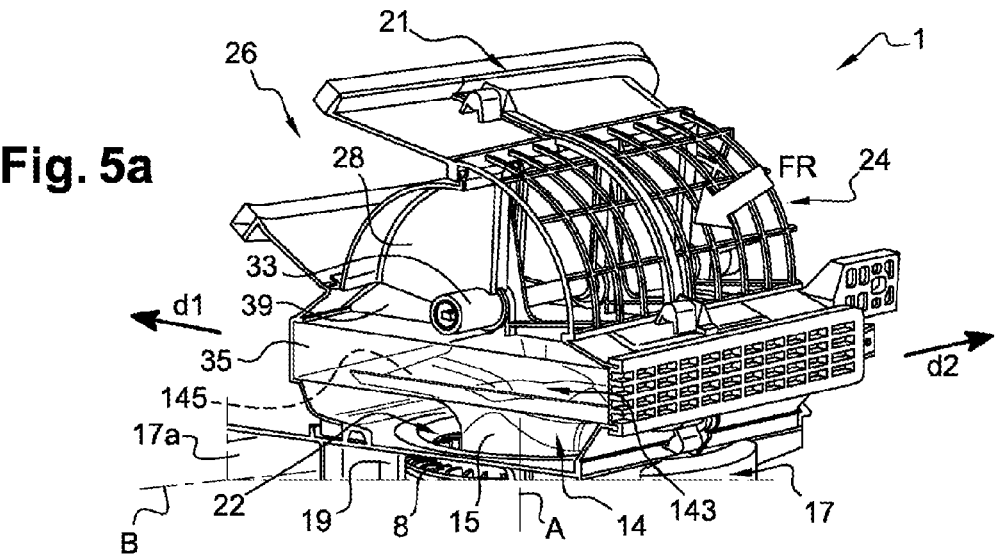
FIG. 5a is a schematic view in axial section of the blower and illustrates a first mode of operation.

The following embodiments are examples of the subject matter of the invention and are given by way of illustration. The invention is not restricted to these embodiments. Although the description refers to one or more embodiments, this does not necessarily mean that each reference relates to the same embodiment, or that the features apply only to one embodiment. Individual features of different embodiments can also be combined or interchanged in order to create other embodiments.

In the description, certain elements may be indexed, or in other words mention may be made for example of a first element of a second element. In this case, the indexing is simply used to differentiate and denote elements that are similar but not identical. This indexing does not imply a priority of one element with respect to another. Such denominations may easily be interchanged without departing from the scope of the present invention.

The invention relates to an air intake housing 21 for an intake blower 1 as illustrated in FIGS. 1 and 2, allowing the flow of at least two different airflows within the blower 1, for example allowing the flow of a recirculated-air airflow FR and of an exterior-air airflow FE.

Blower

FIGS. 1 and 2 depict a blower 1, notably for a motor vehicle heating and/or ventilation and/or air conditioning device.

The intake blower 1 notably comprises an air generating member such as a turbine 2, intended to be driven in rotation about an axis A, notably by an electric motor (not visible in the figures), so as to blow the air. The blower 1 generally comprises a housing, commonly referred to as the blower housing 17, surrounding the turbine 2. As previously stated, the blower 1 comprises an additional housing forming an air intake housing 21. The blower 1 also advantageously comprises at least one member for separating airflows.

The turbine 2 is, for example, of cylindrical overall shape, with axis A. In the remainder of the description, the terms axial and radial refer to the axis A.

The turbine 2 comprises blades 3 at its radially external periphery and internally delimits a cylindrical space.

The turbine 2 comprises a first axial part 5 referred to as "upper part" and a second axial part 6 referred to as "lower part". The first axial part 5 extends from a first end 7 of the turbine 2 as far as an axially central zone. The second axial part 6 extends from the axially central zone as far as a second end 8, opposite the first end 7, of the turbine 2.

A hub (not depicted) is generally fixed to the turbine 2 and acts as a deflector for the circulating airflows. The hub takes, for example, the form of a component exhibiting symmetry of revolution of axis A.

A rotary drive shaft (not depicted) of the electric motor is for example fixed to a central region of the hub. In operation, the motor drives the rotation of the hub and the turbine 2.

The terms top and bottom, or upper and lower, are defined here with reference to the figures and are nonlimiting in nature.

The blower housing 17 surrounding the turbine 2 ducts the blown airflow. More specifically, an airflow is drawn in and made to circulate by the turbine 2 and is then extracted from the blower housing 17 via an outlet 17a (depicted partially in FIG. 3), intended to be connected to an air canal of the heating, ventilation and/or air conditioning device. According to the embodiment described, the blower housing 17 defines a spiral overall shape. The spiral shape of the blower housing 17 therefore has a coil(s) first part. The shape of the blower housing 17 then evolves more linearly, thus forming the blower housing outlet 17a as far as an air outlet opening which opens, for example, into the air duct of the heating, ventilation and/or air conditioning device. The outlet 17a of the blower housing 17 therefore ends in this air outlet opening which lies within a plane, which is depicted vertical with reference to the layout in FIG. 3. When assembled into the motor vehicle, the air outlet opening may notably lie in a plane along the longitudinal axis of the vehicle and the vertical axis.

The outlet 17a of the blower housing 17 evolves along an axis B. This is an axis transverse to the plane in which the air outlet opening lies.

The axis B of extension or of evolution of the blower housing outlet 17a is orthogonal to the axis A of rotation of the turbine 2 (as indicated schematically in FIG. 3). In addition, the airflow or airflows leaving the outlet of the blower housing 17 flow along the axis B.

Moreover, the blower housing 17 may also at least partially surround the motor (not depicted).

The blower housing 17 comprises two ducts 18, 19 extending facing the first and second axial parts 5, 6 of the turbine 2 respectively. In light of the layout in FIGS. 1 to 3, the duct 18 forms a lower duct facing the lower part 5 of the turbine 2, and the duct 19 an upper duct facing the upper part 6 of the turbine 2.

The blower housing 17 may further comprise a dividing wall (not visible in the figures), for example of annular shape, providing delineation of the two ducts 18, 19. The dividing wall may be arranged in such a way as to divide the blower housing 17 into two, advantageously equal, halves.

The blower housing 17 comprises an upper opening 22 allowing the passage of at least one airflow within the blower 1. This upper opening 22 is better visible in FIG. 3.

Figure 5B:
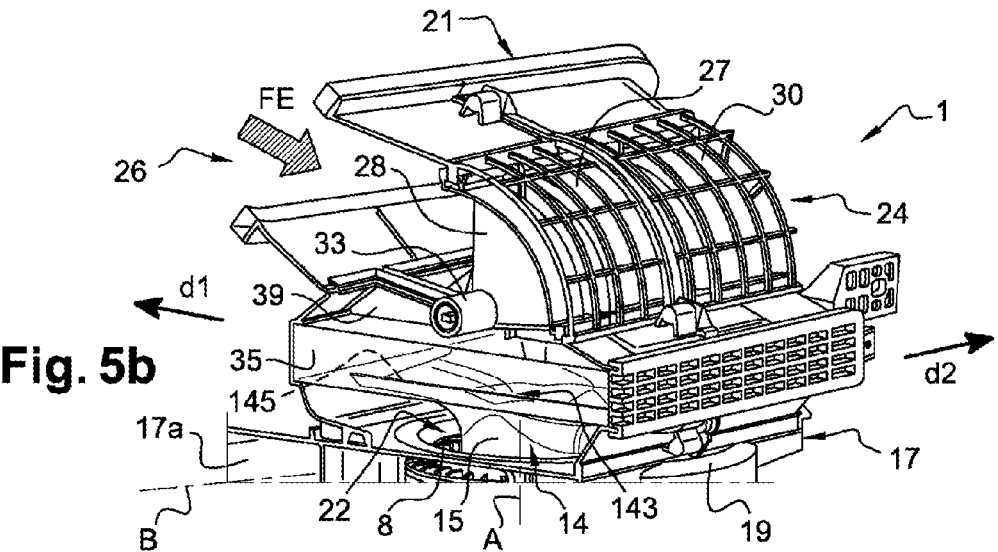
FIG. 5b is a schematic view in axial section of the blower and illustrates a second mode of operation.
Figure 5C:
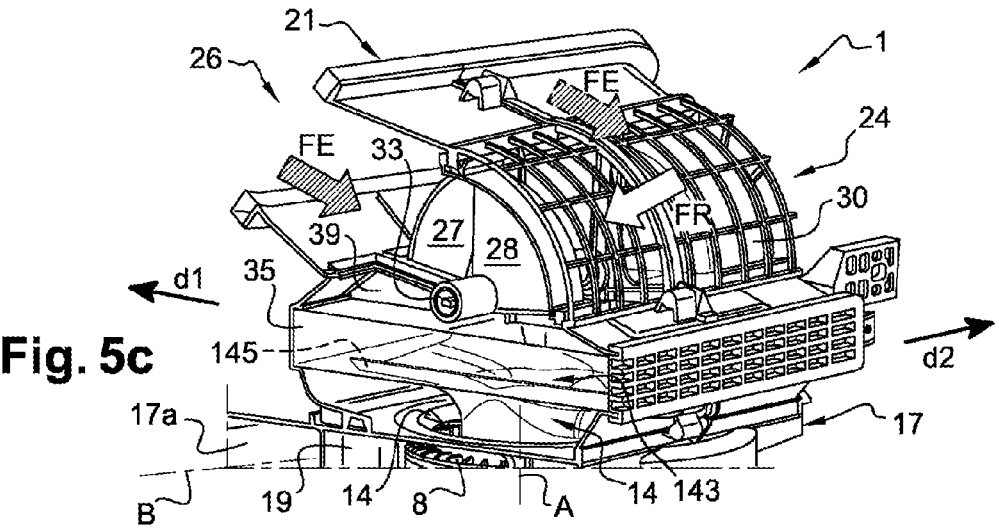
FIG. 5c is a schematic view in axial section of the blower and illustrates a third mode of operation.

With reference to FIGS. 5a to 5c, the air intake housing 21 is fixed above the upper opening 22 of the blower housing 17.

The air intake housing 21 comprises an internal space. The internal space delimits an air passage section. The internal space of the air intake housing 21 is open toward the bottom with reference to the layout in FIGS. 5a to 5c, namely open toward the turbine 2.

The air passage section is delimited by a first dimension d1 which corresponds to the depth, a second dimension d2 which corresponds to the width, and the height along the axis A. The directions of the dimensions d1 and d2 are indicated by arrows in FIGS. 1 to 3.

With reference more particularly to FIG. 3, the second dimension d2 extends here parallel or substantially parallel to the axis B of the blower housing outlet 17a. The first dimension d1 extends in a direction orthogonal to the axis B of extension of the blower housing outlet 17a.

Furthermore, the air intake housing 21 comprises at least two distinct air inlets 24, 26, to allow the different airflows, notably the recirculated-air airflow FR and the exterior-air airflow FE, to flow within the blower 1.

Referring once again to FIGS. 1 and 2, the air inlets 24, 26 extend consecutively in the direction of the depth d1 of the air intake housing 21. Each air inlet 24, 26 extends over the entirety of the width d2 of the air intake housing 21 and over just part in the direction of the depth d1.

The air inlet 24 corresponds to an opening for the passage of the recirculated-air airflow FR and is referred to hereinafter as the recirculated-air inlet 24. The air inlet 26 corresponds to an opening for the passage of the exterior-air airflow FE and is referred to hereinafter as the exterior-air inlet 26. Of course, the air inlets 24 and 26 may be reversed.

In order to manage the admission of the different airflows, the air intake housing 21 further comprises air guiding means or members 27, 28, 30 (see FIGS. 2 and 3). The air guiding members 27, 28, 30 may direct airflows of different types, notably the recirculated-air airflow and the exterior-air airflow, for different modes of operation. In particular, they allow an airflow to be directed into a first air circulation duct and, more generally, toward the first axial part 5 of the turbine 2, and/or into a second air circulation duct, and more generally toward the second axial part 6 of the turbine 2. The air guiding members comprise one or more mobile flaps 27, 28, 30.

In particular, these may be drum, butterfly or end-hung flaps. A butterfly flap corresponds to a flap comprising at least one lateral vane or wall and a rotation shaft situated at the center of the flap, for example in instances in which there are two lateral walls, the rotation shaft is arranged between the two lateral walls. An end-hung flap corresponds to a flap comprising at least one vane and a rotation shaft situated at one end of the flap. A drum flap corresponds to a flap comprising two lateral walls lying in two distinct and mutually parallel planes, with a curved wall, serving to prevent the airflow from passing, connecting the two lateral walls and a rotation shaft serving to cause the rotational movement via an actuator likewise connects the two lateral walls. In other words, the curved wall and the rotation shaft form a continuity of material between the two lateral walls.

According to the embodiment described, the air guiding members here comprise several flaps (better visible in FIG. 3), for example three flaps, these being a central flap 27 and two lateral flaps 28 30 on either side of the central flap 27. These are advantageously flaps of the same nature, such as drum flaps.

According to the embodiment described, the central flap 27 and the lateral flaps 28, 30 are arranged between the recirculated-air inlet 24 and the exterior-air inlet 26 so as to be able to shut off these two air inlets 24, 26 at least partially or completely according to the mode of operation.

In this example, the central flap 27 and the lateral flaps 28, 30 are arranged in such a way as to be driven in rotation about a pivot axle. In particular, the pivot axle is an axle 33 common to all three flaps 27, 28, 30. In other words, the three flaps 27, 28, 30 are coaxial and able to move about a single pivot axle 33.

According to this embodiment, the pivot axle 33 is parallel to the axis B, which corresponds to the axis of extension of the blower housing outlet 17a, or in other words, to the axis of flow of at least one airflow leaving the blower housing 17.

In addition, the pivot axle 33 is orthogonal to the axis A of rotation of the turbine 2. Furthermore, with reference to the view from above, as indicated symbolically in FIG. 4, the pivot axle 33 is orthogonal to the overall direction of admission of the exterior-air airflow FE and recirculated-air airflow FR.

The flaps 27, 28 and 30 each extend not over the entirety of the width d2 of the air passage section, but each over a portion of the width d2 of the air passage section in the air intake housing 21. In other words, these flaps 27, 28, 30 are arranged in three rows between the exterior-air inlet 26 and the recirculated-air inlet 24.

Figure 6:
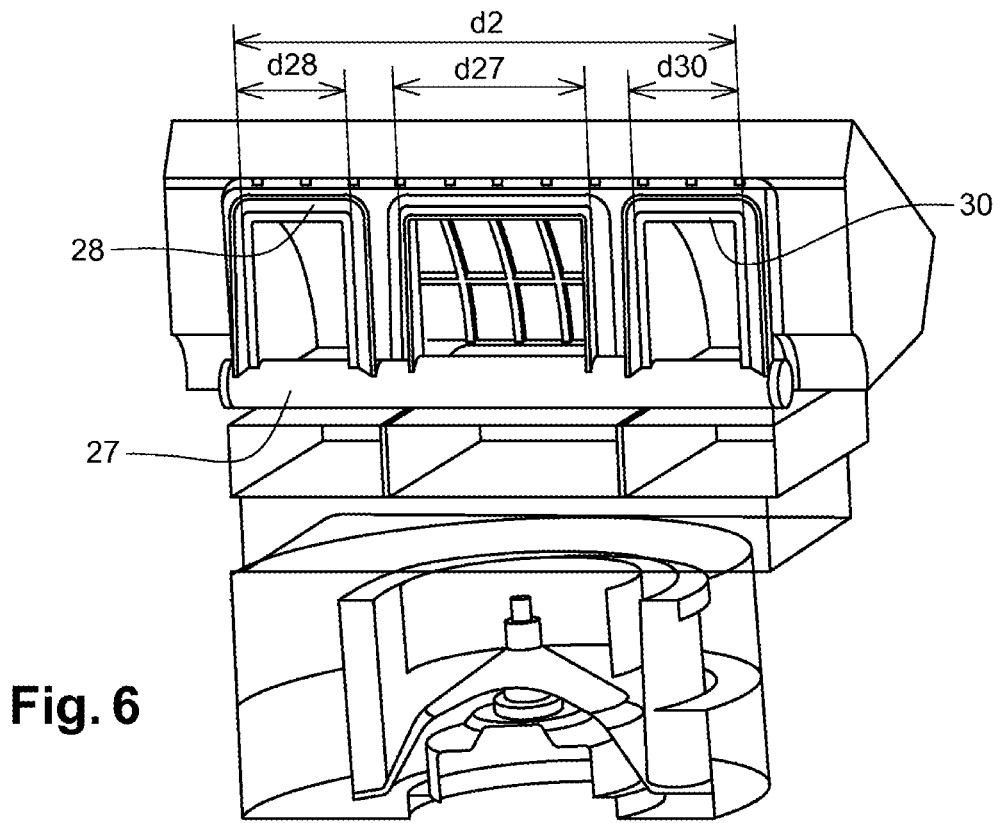
FIG. 6 corresponds to a perspective view of a blower according to the invention.

According to the invention, as illustrated in FIG. 6, the central flap 27 extends over a portion d27 of said width d2 of the air passage section in the air intake housing 21 that is greater than the portion d28, d30 of the width d2 over which the two lateral flaps 28, 30 extend, as illustrated in FIG. 6. More specifically, the central flap 27 extends over more than half of the width d2 of the air passage section (d27>d28+d30). It may be mentioned by way of example that the central flap 27 extends over a range comprised in the interval [50%-80%] of the width d2 of the air passage section. According to one preferred embodiment, the central flap 27 extends over 70% of the width d2 of the air passage section in the air intake housing 21 (d27=0.7×d2), each lateral flap 28, 30 extending over 15% of the width d2 of the air passage section (d28 or d30=0.15×d2). In other words, by way of example, if the width d2 of the air passage section occupies 154 mm, then in this case, the central flap 27 extends over, or covers, 105 mm of the width d2, and each lateral flap covers 24.5 mm of the width d2.

Each flap 27, 28, 30 has a travel between two extreme positions, a first extreme position in which the flap shuts off the exterior-air inlet 26, and a second extreme position in which the flap shuts off the recirculated-air inlet 24.

In each extreme position, the lateral flaps 28, 30 come to bear against at least one end stop, for example at rims, of bearing walls, such as a curved wall, a planar wall, or else an end stop overmolded onto a planar wall, of the air intake housing 21.

Thus, when the vehicle starts, the lateral flaps 28, 30 shut off the recirculated-air inlet 24 and the central flap 27 shuts off the exterior-air inlet 26. The flow of recirculated air therefore represents 70% of the incoming air flow and the interior is therefore warned up more rapidly while at the same time avoiding the fogging of the windshield since 30% of the incoming air flow, corresponding to the flow of exterior air, is directed toward the interior. This arrangement considerably improves the vehicle "warm-up".

The blower 1, and notably the air guiding members, further comprise kinematics means linking their respective travels so as to synchronize the movements of at least certain flaps, thus limiting the number of actuators required. The kinematics means comprise for example camways with several output pinions, link rods connecting the flaps, etc. A shared actuator may notably operate the various flaps simultaneously.

Referring once again to FIGS. 1 to 3, the airflow separation member or members are themselves able to separate a first airflow intended to pass through the first axial part 5 of the turbine 2 from a second airflow intended to pass through the second axial part 6 of the turbine 2. They are notably configured to delimit:

the first air circulation duct that allows the first airflow to flow, and the second air circulation duct that allows the second airflow to flow.

The airflow separation member or members are arranged fixedly in the blower 1.

In particular, the airflow separation member or members comprise a dividing partition 14 able to separate the first airflow and the second airflow, this dividing partition 14 being better visible in FIG. 3.

The dividing partition 14 is mounted within the blower 1 and extends at least in part into the internal space of the turbine 2.

The dividing partition 14 extends for example from a central region of the turbine 2, between the two axial parts 5, 6, in the direction of the air intake housing 21 (which is not visible in FIG. 3). In this example, the dividing partition 14 extends from the central region of the turbine 2 as far as a point situated beyond the second end 8.

The dividing partition 14 is mounted fixedly with respect to the blower housing 17. It may be a component that is added onto or molded with the blower housing 17.

Furthermore, it is a hollow member defining a duct of closed contour.

The dividing partition 14 is arranged in such a way as to separate the airflows into a central flow circulating inside the dividing partition 14 and a peripheral flow circulating around the dividing partition 14. The central flow corresponds to the first airflow. The peripheral flow corresponds to the second airflow.

In other words, the dividing partition 14 delimits an internal duct at least partially forming the first air circulation duct, the second air circulation duct extending on the outside of the dividing partition 14.

The dividing partition 14 advantageously has a shape that exhibits symmetry of revolution. This dividing partition 14 may be coaxial with the turbine 2. In that case, the dividing partition 14 has a shape exhibiting symmetry of revolution about the axis A of rotation of the turbine 2.

The diameter of the dividing partition 14 is advantageously chosen to ensure the distribution of the airflows when these are different, in the lower housing 17, and thereafter in the motor vehicle, in desired proportions, for example nonlimitingly of the order of 60% in the upper duct 19 and of the order of 40% in the lower duct 18.

The dividing partition 14 may have an overall shape that is at least partially flared in order to direct the airflows toward the blades 3 of the turbine 2.

By way of example, the dividing partition 14 may comprise a cylindrical or tubular upper or upstream part 15. The cylindrical upper part 15 extends between an intermediate part 57 which will be described later and a lower part of the air intake housing 21.

The dividing partition 14 may also have a lower or downstream part that flares toward the bottom. In other words, the lower part, and more generally the dividing partition 14, widens in the direction from upstream toward downstream. The terms upstream and downstream are defined with reference to the direction in which the air flows through the blower 1. Such a lower part may extend between the intermediate part 57 and the axially central region of the turbine 2. The lower part may have a shape exhibiting symmetry of revolution of axis A. Advantageously, the radial periphery of the lower part is smaller than the radial periphery of the blades 3 of the turbine 2, so as not to impede the rotating of the blades 3.

Figure 7:
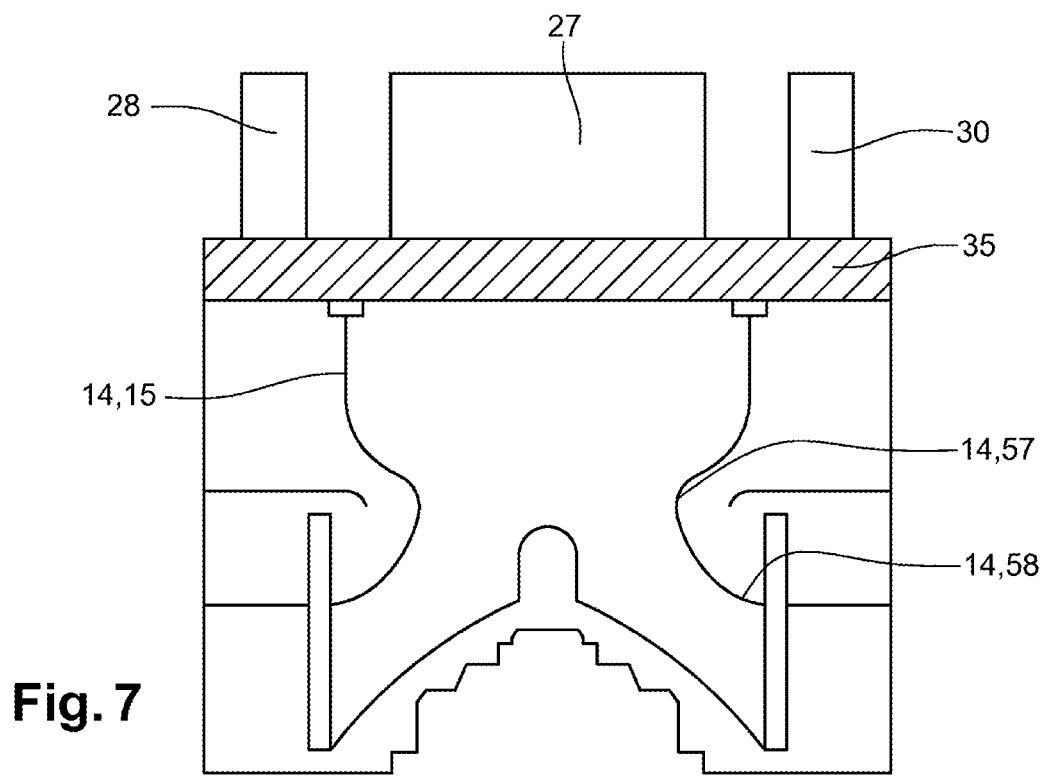
FIG. 7 corresponds to a profile view of the blower, in vertical section.

As illustrated in FIG. 7, the dividing partition 14 further comprises an intermediate part 57 arranged between the upstream part 15 and the downstream part 58 and connecting these two parts, the intermediate part 57 is arranged at the second end 8 of the turbine 2. The intermediate part 57 is of a cross section that is reduced in comparison with the two, upstream 14 and downstream 58, parts, or in other words it corresponds to a point at which the air flow flowing along inside the duct defined by the dividing partition 14 is throttled. In other words, the duct defined by the dividing partition 14 has smaller dimensions along at least two axes, or even three axes, that are orthogonal, or else the perimeter of the air passage section of the intermediate part 57 is inscribed inside the perimeter of the section of the upstream 14 and downstream 58 parts. Another way of describing this intermediate part 57 is to consider that the air passage section is reduced downstream of the upstream part 14 and reduced upstream of the downstream part 58 with respect to the air flow. Finally, the dividing partition 14 may also be considered to have a section of the profile comprising at least two inflections, or in other words, the dividing partition 14 viewed in profile with a cross section in the direction of flow of the air flow exhibits at least two inflections, or changes in direction of the dividing partition 14, that is to say at least one elbow or else two bends each greater than 30°. It may also be said that the dividing partition 14, viewed in profile with a cross section in the direction of the air flow has an S-shaped profile. The dividing partition 14 has an upstream end 141. This upstream end 141 notably terminates the upper part 15 on the opposite side to the lower part 16.

The upstream end 141 extends into the air intake housing 21, notably into the lower part of the air intake housing 21.

In particular, the upstream end 141 extends over the entirety of the first dimension or depth d1 and over just part of the second dimension or width d2. Thus, air can flow in the lateral passages situated between the external surface of the dividing partition 14 and the internal wall of the air intake housing 21 or the edge of the upper opening 22 of the blower housing 17 (FIG. 3).

This upstream end 141 has for example a substantially rectangular cross section. The upstream end 141 has an opening 143, notably a central opening, in the continuation of the internal duct of the dividing partition 14 forming at least part of the first air circulation duct. This opening 143 is delimited by two retaining plates 145 which hold the dividing partition 14 in the blower 1.

When mounted in the blower housing 17, the upstream end 141, particularly the retaining plates 145 thereof, come to bear against the blower housing 17, more specifically against an upper wall or rim of the blower housing 17.

Along the second dimension d2 of the air intake housing, the retaining plates 145 have an extent similar to the extent of the central flap 27. In other words, the width of the retaining plates 145 is equal or substantially equal to the width of the central flap 27.

The upstream end 141 of the dividing partition 14 may be connected to the cylindrical upper part 15 by a region of gradual connection.

The upper opening 22 of the blower housing 17 allows the dividing partition 14, particularly the upper part 15, to pass. The internal space of the air intake housing 21 allows air to enter the dividing partition 14 and/or the turbine 2 via the upper opening 22. Thus, the airflows are able to flow within the dividing partition 14 and in lateral passages situated between the external surface of the dividing partition 14 and the edge of the upper opening 22 of the blower housing 17.

According to the embodiment described, the peripheral airflow circulating around the dividing partition 14 feeds into the upper duct 19 of the blower housing 17. The central flow coming from inside the dividing partition 14 feeds into the lower duct 18 of the blower housing 17.

Furthermore, the airflow separation member or members further comprise an additional dividing partition 39, better visible in FIG. 3.

The additional dividing partition 39 is arranged in the air intake housing 21 in such a way as to at least partially surround an end region of the central flap 27 in one extreme position.

Advantageously, the additional dividing partition 39 has at least one end stop against which the central flap 27 may end its travel, so as to allow the exterior-air inlet 26 or the recirculated-air inlet 24 to be shut off in an airtight manner.

According to the embodiment described, the additional dividing partition 39 has a base, particularly a frame 391 forming a base. This frame 391 extends mainly in a direction of extension orthogonal to the axis B of extension of the blower housing outlet 17*a*. This frame 391 extends mainly in a direction of extension orthogonal to the axis B of extension of the blower housing outlet 17*a*, or in other words, orthogonal to the axis of flow of at least one airflow leaving the blower housing 17.

The frame 391 is arranged facing the upstream end 141 of the dividing partition 14.

The frame 391 has a shape that complements the shape of the upstream end 141 of the dividing partition. In particular, the frame 391 has a contour similar in shape to the upstream end 141, in this example of substantially rectangular shape. The dimensions of the frame 391 are for example equal or substantially equal to the dimensions of the upstream end 141. In each extreme position, the central flap 27 ends its travel against the lateral sides, notably the short lateral sides, of the frame 391.

The frame 391 delimits an interior cavity 393. This cavity 393 allows the air to pass. According to the embodiment described, the additional dividing partition 39 is symmetrical with respect to the pivot axle 33.

The additional dividing partition 39 further comprises a belt 395 which extends plumb with one of the faces of the frame 391, for example from a central or substantially central region of the frame 391. This belt 395 delimits an interior cavity. The belt 395 is configured so as to surround the central flap 27 and, more specifically, an end region of the central flap 27 when it is in one or other of the extreme positions. The shape of the belt 395 of the additional dividing partition 39 complements the shape of the central flap 27, particularly the transverse cross section of the central flap 27.

The additional dividing partition 39, and particularly the belt 395, ensures separation from the lateral flaps 28, 30.

In order to improve the air quality, the air intake housing 21 may further comprise at least one filter 35 (see FIGS. 5*a* to 5*c*). This filter 35 is intended to have the first and the second airflows pass through it. The filter 35 is therefore arranged downstream of the air inlets 24, 26 in the direction in which air flows in the air intake housing 21. It may notably be a pleated medium.

The filter 35 is mounted in the air intake housing 21, notably in the lower part of the air intake housing 21, occupying all or almost all of the width d2 and of the depth d1 of the air passage section in the internal space of the air intake housing 21. In general, the filter 35 is arranged axially between the dividing partition 14 and the air inlets 24, 26. According to the embodiment variant illustrated in FIGS. 5*a* to 5*c*, the filter 35 is mounted axially between, on the one hand, the dividing partition 14 and, on the other hand, the additional dividing partition 39, and notably also the coaxial flaps 27, 28, 30. Such a filter 35 may easily be removed, by opening or removing the air intake housing 21 which is accessible for example from the vehicle glovebox.

In the figures, the filter 35 is depicted as a filter of rectangular overall shape. Of course, this shape is nonlimiting. The filter 35 may be a flat or rounded filter.

In the case of a rectangular filter 35, this extends in the length direction along the second dimension d2, and in the width direction along the first dimension d1. The upstream end 141 of the dividing partition 14 then extends along the entire width of the filter 35 and over just part of the length of the filter 35.

As an alternative, the filter 35 may be arranged not in the air intake housing 21 but elsewhere in the heating and/or ventilation and/or air conditioning device. By way of non-limiting example, in that case, the filter 35 may be positioned upstream of a heat exchanger of the heating and/or ventilation and/or air conditioning device, such as an evaporator.

Advantageously, the filter 35 comprises air guides (not depicted in the figures), comprising for example one or more dividing partitions or strips, making it possible to limit or even prevent mixing between airflows, notably when the blower 1 is operating in a way in which distinct airflows are admitted. The air guides may be components added to the filter 35. These air guides are positioned in the continuity of the long sides of the additional dividing partition 39 so as to partition the airflows coming from the distinct air inlets 24 and 26 of the air intake housing 11. As a variant, several distinct filters, for example three filters, may be used.

In instances in which the filter 35 is not arranged in the air intake housing 21, it is possible to conceive of the additional dividing partition 39 and the dividing partition 14 being produced as a single piece.

Blower Operation

The blower 1 can operate in several modes of operation, including in particular:

a first mode known as 100% recirculation mode (FIG. 5*a*), in which only recirculated air FR is drawn into the blower 1, a second mode known as 100% fresh mode (FIG. 5*b*), in which only exterior air FE is drawn into the blower 1, or else a 50/50 third mode (FIG. 5*c*), in which exterior air FE and recirculated air FR are drawn into the blower 1.

100% Recirculation Mode

FIG. 5*a* illustrates the first mode of operation, 100% recirculation mode, in which only recirculated air FR is drawn into the blower 1, so as to supply the heating, ventilation and/or air conditioning device with recirculated air FR. Such a mode of operation may for example be used when the air is being air-conditioned (for example in the summer). Specifically, in such a case, the moisture present in the interior air has a tendency to condense as it passes through the evaporator used for cooling the air. This recirculated air therefore contains little, if any, moisture and can be sent into the interior, notably into the vicinity of the windshield.

In this mode of operation, the coaxial flaps 27, 28, 30 are in the first extreme position of shutting off the exterior-air inlet 26, leaving the recirculated-air inlet 24 uncovered. In that way, the exterior-air airflow FE is unable to flow within the blower 1, whereas the recirculated-air airflow FR is able to flow within the blower 1, through the recirculated-air inlet 24.

Thus, with reference also to FIGS. 1 to 3, at least part of the recirculated-air airflow FR, corresponding to the air drawn from the interior, therefore enters via the recirculated-air inlet 24, passes the additional dividing partition 39, the filter 35, the dividing partition 14, the lower part 5 of the turbine 2 and enters the duct 18, the latter opening for example into the vehicle interior some way away from the windshield. In parallel, another part of the recirculated-air airflow FR coming from the recirculated-air inlet 24, passes through the filter 35 and the lateral passages situated between the external surface of the dividing partition 14 and the edge of the upper opening 22 of the blower housing 17, the upper part 6 of the turbine 2 and enters the duct 19, the latter opening for example into the vehicle interior in the vicinity of or directly facing the windshield.

In short, the recirculated-air airflow FR flows both through the first circulation duct and the second circulation duct before opening into the interior.

100% Fresh Mode

FIG. 5b illustrates the second mode of operation, 100% fresh mode, in which only exterior air FE is drawn into the blower 1, so as to supply the heating, ventilation and/or air conditioning device with exterior air. Such a mode of operation may for example be used in the event of the exterior air being heated (for example in the winter or at mid-season) while at the same time preventing too much fog from forming on the windshield.

In this mode of operation, the coaxial flaps 27, 28, 30 are in the second extreme position of shutting off the recirculated-air inlet 24, leaving the exterior-air inlet 26 uncovered.

In that way, the exterior-air airflow FE is able to flow within the blower 1, whereas the recirculated-air airflow FR is not able to flow within the blower 1.

In this case, with reference also to FIGS. 1 to 3, the exterior-air airflow FE, entering via the exterior-air inlet 26, passes the additional dividing partition 39, the filter 35, the dividing partition 14, the lower part 5 of the turbine 2 and enters the duct 18, the latter opening into the vehicle interior, for example some way away from the windshield. At the same time, the exterior-air airflow FE also flows, via the outside of the dividing partition 14, into the upper part 6 of the turbine 2 and enters the duct 19, the latter opening into the vehicle interior, for example in the vicinity of for directly facing the windshield.

In short, the exterior-air airflow FE flows both through the first circulation duct and the second circulation duct before opening into the interior.

50/50 Mode

FIG. 5c illustrates the 50/50 third mode of operation in which exterior air FE and recirculated air FR are drawn into the blower 1, so as to supply the heating, ventilation and/or air conditioning device with exterior air and with recirculated air, the blower 1 being able to generate two distinct airflows. Such a mode of operation may for example be used in the event of the air being heated (for example in the winter or at mid-season) and makes it possible to reduce the time taken to reach a setpoint temperature, the temperature of the air drawn from the interior being higher than the temperature of the external air, but without too much fog forming on the windshield.

For this mode of operation, the air guiding members allow the first airflow, in this instance the recirculated-air airflow FR to be directed into the first air circulation duct, and the second airflow, in this instance the exterior-air airflow FE to be directed into the second air circulation duct.

In this mode of operation, the central flap 27 is in the first extreme position of shutting off the exterior-air inlet 26. The lateral flaps 28, 30 are in the second extreme position of shutting off the recirculated-air inlet 24.

In that way, the exterior-air airflow FE can flow within the blower 1 through the exterior-air inlet 29 to be guided toward the outside of the dividing partition 14, and the recirculated-air airflow FR can also flow into the blower 1 through the central flap 27 which guides the recirculated-air airflow FR toward the inside of the additional dividing partition 39 and then of the dividing partition 14.

In this mode of operation, the airflows are divided into a central flow which is the recirculated-air airflow FR and a peripheral flow which is the exterior-air airflow FE.

Thus, with reference also to FIGS. 1 to 3, the recirculated-air airflow FR passes through the additional dividing partition 39, the filter 35, the dividing partition 14 and the lower part 5 of the turbine 2 and enters the duct 18, the latter opening for example into the vehicle interior some way away from the windshield. At the same time, the exterior-air airflow FE flows, via the outside of the dividing partition 14, into the upper part 6 of the turbine 2 and enters the duct 19, the latter opening for example into the vehicle interior in the vicinity of or directly facing the windshield.

With this arrangement, the three coaxial flaps 27, 28, 30, notably complementing the dividing partition 14, partition the air intake housing into three distinct parts separated by the coaxial flaps 27, 28, 30 and the additional dividing partition 39. The coaxial flaps 27, 28, 30 make it possible to limit the number of partitions for separating the airflows. Furthermore, the upstream end 141 of the dividing partition 14 is turned through approximately 90° in comparison with the solutions of the prior art, so as to optimize this partitioning. The upstream end 141 therefore extends in the direction of the depth of the air intake housing 121 which also corresponds to the direction of the width of the filter 35, when provided, rather than in the direction of the length of the filter 35 as in the solutions of the prior art.

Finally, the partitioning obtained with the dividing partitions 14, 19 according to this solution makes it possible to limit the mixing between the airflows when these are different and thus reduce the risks of fogging in the 50/50 mode of operation.

The invention claimed is:

1. An air intake housing for a heating, ventilation and/or air conditioning device, comprising:
    at least two distinct air inlets extending over a width of the air intake housing; and
    air guiding members configured to direct at least one airflow configured to be admitted into the air intake housing,
    the air guiding members comprising at least three flaps, the at least three flaps comprising a central flap and two lateral flaps arranged on either side of the central flap, said at least three flaps being arranged between said at least two distinct air inlets of the air intake housing, such as to be able to move about a single pivot axle,
    wherein the central flap extends over a portion of said width of the air intake housing that is greater than the portion of the width over which the two lateral flaps extend.

2. The air intake housing as claimed in claim 1, wherein each flap of said at least three flaps is configured to move between a first extreme position to close a respective portion of a first air inlet of said at least two distinct air inlets, and a second extreme position to close a respective portion of a second air inlet of said at least two distinct air inlets.

3. The air intake housing as claimed in claim 1, wherein said at least three flaps are of the drum type.

4. The air intake housing as claimed in claim 1, wherein the central flap extends over the portion of said width of the air intake housing that is comprised within an interval located between 60% and 80% of said width of the air intake housing.

5. An intake blower for a motor vehicle heating, ventilation and/or air conditioning device, the blower comprising:
    a fan configured to be driven in rotation about an axis and having at least a first part and a second part;
    a blower housing surrounding the fan and having a blower housing outlet extending along an axis; and
    an air intake housing comprising
        at least two distinct air inlets extending over a width of the air intake housing, and
        air guiding members configured to direct at least one airflow configured to be admitted into the air intake housing, the air guiding members comprising at least three flaps comprising a central flap and two lateral flaps arranged on either side of the central flap, said at least three flaps being arranged between said at least two distinct air inlets of the air intake housing, such as to be able to move about a single pivot axle, wherein the central flap extends over a portion of said width of the air intake housing that is greater than the portion of the width over which the two lateral flaps extend, the pivot axle of the flaps being parallel to the axis of extension of the blower housing outlet.

6. The intake blower as claimed in claim 5, further comprising a dividing partition extending at least in part into the fan, so as to separate a first airflow intended to pass through a first axial part of the fan and a second airflow intended to pass through a second axial part of the fan.

7. The intake blower as claimed in claim 6, wherein the dividing partition has an intermediate part arranged to connect an upstream part and a downstream part, the intermediate part is arranged at an end of the fan, the intermediate part having a cross section that is reduced in comparison with the upstream part and the downstream part.

8. The intake blower as claimed in claim 7, wherein:
the dividing partition has an upstream end extending into the air intake housing in a main direction of extension orthogonal to the axis of extension of the blower housing outlet and to the axis of rotation of the fan,
the air intake housing comprises an internal space delimiting an air passage section having a first dimension in a direction orthogonal to the axis of extension of the blower housing outlet, and a second dimension parallel to the axis of extension of the blower housing outlet, and the upstream end of the dividing partition extends over the entirety of the first dimension and over part of the second dimension.

9. The intake blower as claimed in claim 4, further comprising an additional dividing partition arranged in the air intake housing in such a way as to at least partially surround an end region of the central flap in one extreme position.

10. The intake blower as claimed in claim 9, wherein the additional dividing partition has a frame extending mainly in a direction of extension orthogonal to the axis of extension of the blower housing outlet, and in line with which there extends a belt so as to at least partially surround an end region of the central flap in one extreme position.

11. An air intake housing for a heating, ventilation and/or air conditioning device, comprising:
at least two distinct air inlets extending over a width of the air intake housing, and
air guiding members configured to direct at least one airflow configured to be received into the air intake housing,
the air guiding members comprising a central flap, and two lateral flaps arranged on either side of the central flap, the central and lateral flaps being arranged between said at least two distinct air inlets of the air intake housing, such as to be able to move about a single pivot axle,
the central flap and two lateral flaps being coaxial, and
the central flap being configured to block off more than half of a surface area of each air inlet.

* * * * *